United States Patent [19]

Bacehowski et al.

[11] 4,299,256
[45] Nov. 10, 1981

[54] COEXTRUDED SILICONE-CONTAINING TUBING HAVING LONG TERM FRICTIONAL LUBRICATION PROPERTIES

[75] Inventors: David V. Bacehowski, Wildwood; Peter C. Kwong, Palatine; Harold H. Bowerman, Jr., Mundelein; Leonard F. Czuba, Lombard, all of Ill.

[73] Assignee: Baxter Travenol Laboratories, Inc., Deerfield, Ill.

[21] Appl. No.: 194,205

[22] Filed: Oct. 6, 1980

[51] Int. Cl.³ .............................................. F16L 11/04
[52] U.S. Cl. .................................... 138/137; 138/141; 138/DIG. 7; 264/173; 264/211; 264/300; 428/36; 428/447; 428/451
[58] Field of Search ....................... 264/173, 211, 300; 525/104; 428/36, 447, 451; 138/137, 140, 141, DIG. 7

[56] References Cited

U.S. PATENT DOCUMENTS

| | | | |
|---|---|---|---|
| 2,470,772 | 5/1949 | Haas | 525/104 |
| 2,471,224 | 5/1949 | Loughborough | 244/134 A |
| 2,558,584 | 6/1951 | Safford | 264/300 |
| 2,705,690 | 4/1955 | Nelson et al. | 525/104 |
| 3,034,509 | 5/1962 | Bernstein et al. | 260/29.1 SB |
| 3,249,666 | 5/1966 | French | 264/173 |
| 3,299,908 | 1/1967 | Petzetakis | 138/122 |
| 3,411,981 | 11/1968 | Thomas | 138/141 |
| 3,428,707 | 2/1969 | Amos et al. | 525/101 |
| 3,428,707 | 2/1969 | Amos et al. | 525/104 |
| 3,632,715 | 1/1972 | Gowdy et al. | 525/105 |
| 3,730,931 | 5/1973 | Simoneau et al. | 521/74 |
| 3,790,510 | 2/1974 | Flannigan | 521/75 |
| 3,795,634 | 3/1974 | Nielsen | 521/73 |
| 3,798,189 | 3/1974 | Simoneau et al. | 521/74 |
| 3,945,955 | 3/1976 | Ihde, Jr. | 521/75 |
| 4,056,224 | 11/1977 | Lolachi | 233/14 R |
| 4,111,356 | 9/1978 | Boggs et al. | 233/2.6 |
| 4,177,182 | 12/1979 | Ichikawa et al. | 260/29.1 SB |
| 4,198,363 | 4/1980 | Noel | 264/45.9 |

FOREIGN PATENT DOCUMENTS 691,628 5/53 Great Britain.
1,529,574 10/78 Great Britain.

Primary Examiner—Willard E. Hoag
Attorney, Agent, or Firm—Paul Flattery; Garrettson Ellis

[57] ABSTRACT

Flexible coextruded tubing having an outer portion (14) of polyvinyl chloride plastic containing a minor amount of intimately mixed silicone oil and having an inner portion (12) of plastic free of silicone oil.

5 Claims, 1 Drawing Figure

4,299,256

COEXTRUDED SILICONE-CONTAINING TUBING HAVING LONG TERM FRICTIONAL LUBRICATION PROPERTIES

TECHNICAL FIELD

The invention of this application relates to flexible tubing, particularly for use in a centrifuge process, or any other desired process, for example roller pump tubing, where the exterior surface of the tubing is subject to friction and abrasion.

By this invention, a significant improvement in the frictional resistance of tubing can be achieved, while at the same time the interior of the tubing remains unchanged.

Accordingly, tubing of this invention may be utilized in high speed centrifuge operations for blood, in which the tubing exterior is subject to violent conditions of abrasion and the like, with the tubing surface maintaining its inherent high lubricity even when some of the surface is worn away by continued abrasion or friction, so that the tubing can have a greatly extended life under such conditions of abrasion or friction.

BACKGROUND ART

Feed tubing for centrifugal processes, particularly processes for separation of blood, are well known. One current centrifugal processing apparatus having such tubing is disclosed in Boggs U.S. Pat. No. 4,164,318.

Also, bowl-type centrifugal separation apparatus is well known, for example, the CELLTRIFUGE ® cell separation apparatus sold by the Aminco Division of Baxter Travenol Laboratories, Inc. of Deerfield, Illinois.

In such systems as are described in the above Boggs patent, the feed tubing to feed blood or other mixtures to the centrifuge, and to remove separated components from the centrifuge, may be subjected in certain portions along its length to strongly abrasive forces on its exterior. Similarly, in other processes such as roller pumping, tubing may be used under abrasive conditions.

It is, of course, known that tubing may be coated with a silicone or other type of oil to serve as a lubrication aid. However, as the abrasion process continues, the oil may be rubbed away, following which the abrasion takes place at a rapidly increased rate, and may actually result in destruction of the tubing.

It is also known to the art to incorporate an oil such as mineral oil into a tubular structure, to provide an inherent lubricity as the mineral oil bleeds out of the structure. Such has been utilized in insertion nozzles for enema sets and the like. However, such a structure can be undesirable, particularly in the field of blood centrifugation or the like, because the lubricating oil in the tubular structure can leach into the bore or lumen or the tubular structure, and thus be transferred into the contents of the liquid materials flowing through the tubular structure.

In accordance with this invention, tubing is provided having high permanent lubricity, with silicone oil incorporated into the outer components of the tubing, while at the same time the bore of the tubing is defined by an inner portion which is substantially free of the silicone oil, so that the contents carried by the tubing are separated therefrom.

It is particularly considered surprising and unexpected that silicone oil can be homogeneously incorporated into tubing having an outer polyvinyl chloride plastic portion because of the known incompatibility between silicone oil and polyvinyl chloride formulations.

DISCLOSURE OF INVENTION

In accordance with this invention, a method is provided for forming tubing having a permanently lubricated outer surface which comprises adding from 1 to 5 parts by weight of silicone oil to 100 parts by weight of powdered polyvinyl chloride plastic, and mixing the components with high shear to form a substantially homogeneous mixture.

Thereafter, tubing is coextruded having telescopically related inner and outer cylindrical portions. The inner cylindrical portion comprises a substantially silicone oil-free, flexible plastic formulation, preferably a polyvinyl chloride formulation. The outer portion of the coextruded tubing comprises the substantially homogeneous mixture containing silicone oil.

The substantially homogeneous mixture is typically of a uniform white color as a result of the incompatibility between the polyvinyl chloride plastic and the silicone oil. Nevertheless, it has been found that when the liquid silicone oil, which is preferably dimethylpolysiloxane, having a viscosity of about 500 to 100,000 cs. at 25° C., is added in the proportions described above (and preferably from 2 to 3 parts by weight per 100 parts of polyvinyl chloride plastic) high shear mixing can form a substantially homogeneous mixture, at least on the macroscopic level. This material may be coextruded to form an outer cylindrical portion of tubing, adhering to an appropriate thermoplastic inner, cylindrical portion which preferably may be made of a polyvinyl chloride formulation, or other plastic material which may be sufficiently compatible with polyvinyl chloride so that multilayered tubing may be coextruded out of the two materials.

For example, the inner portion may constitute a polyolefin plastic, if desired, such as polypropylene, polyethylene or mixtures thereof, or block copolymers of polystyrene and rubbery polyolefin materials such as butadiene or poly(ethylene-butylene). To increase the adhesive compatibility of polyolefins to the outer vinyl layer, a known flexible block copolymer of covalently-bonded polybutylene terephthalate units and poly(1,4-butylene) oxide units may be admixed with the polyolefin. Such a material is sold under the trade name Hytrel by E. I. DuPont de Nemours & Co. Likewise, the inner portion of the tubing may comprise poly(ethylene-vinyl acetate), or the block copolymers of the type sold under the trade name Hytrel may be used per se as the inner cylindrical portion of the tubing, among other materials.

Preferably, the inner portion of the tubing is of 2 to 4 times the radial thickness of the outer portion, both for purposes of economy since the material of the inner portion is likely to be less expensive than the outer portion material, and also to prevent migration of the silicone material into the bore of the tubing.

The outer portion preferably has a radial thickness of at least 0.025 cm., and the thickness is preferably greater than that, i.e., at least about 0.074 cm., to prolong the life of the tubing under abrasion since, as tubing material is worn away, more silicone oil is exposed to reduce the frictional characteristics of the surface even after substantial wear. Also, the silicone can migrate to the surface without actual wear of the vinyl polymer material taking place.

The resulting tubing thus may be used in centrifugal separation processes and the like, with long life under extreme abrasion conditions, while at the same time preventing migration of silicone oil to the bore of the tubing. The tubing can be of low cost because preferably only a minor portion of the volume of the total tubing contains silicone oil.

DESCRIPTION OF SPECIFIC EMBODIMENT

Figure 1:
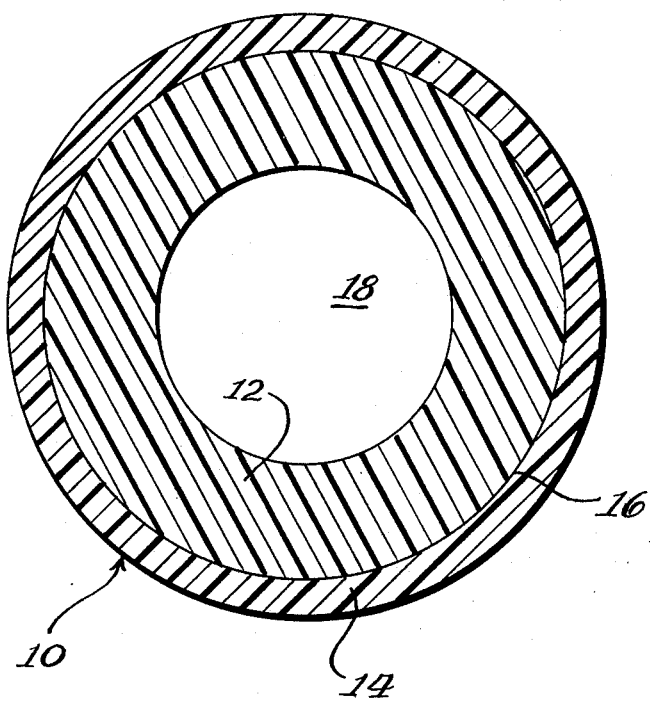
FIG. 1 is a transverse, sectional view of the flexible tubing of this invention.

Referring to FIG. 1, a transverse sectional view of tubing 10 is disclosed. The specific tubing defines telescopically related inner cylindrical portion 12 and outer cylindrical portion 14, being coextruded by conventional tubing coextrusion apparatus. Inner portion 12 may include a substantially silicone oil-free, flexible plastic formulation, preferably a polyvinyl chloride plastic formulation, plasticized with 27 percent by weight, for example, of di-2-ethylhexylphthalate.

The outer cylindrical portion 14 may comprise a similar plasticized polyvinyl chloride (P.V.C.) formulation, but containing 3 parts by weight of dimethylpolysiloxane having a viscosity of about 12,500 cs. at 25° C. (Dow Corning 200 fluid) per 100 parts by weight of the polyvinyl chloride plastic formulation.

As stated above, the components of outer cylindrical portion 14 may be directly mixed, the silicone oil being preferably added slowly to the powdered polyvinyl chloride plastic formulation with high shear mixing, which permits the intimate physical mixing of the silicone oil between the grains of powdered plastic formulation.

As a specific embodiment, mixing took place by loading P.V.C. powder into a Welex mixer, with the mixing shear elevating the P.V.C. powder temperature to 140° F. Then the silicone oil was slowly added over a mixture of two. Mixing continued for 2 or 3 additional minutes or longer, until the blend temperature reached 200° F. Then the mixer was run at low speed and jacket cooling water applied until the blend temperature was 120° F.

The material was removed from the mixer, and conventionally pelletized.

Following this, the two plastic formulations may be appropriately charged into a conventional screw coextrusion system, and the tubing extruded at a temperature of about 300° to 350° F. Specifically, the tubing shown has an outer diameter of 0.25 inch (0.635 cm.). The outer diameter of the circular junction 16 between inner portion 12 and outer portion 14 may be 0.22 inch (0.559 cm.), so that the radial thickness of outer portion 16 can be seen to be 0.015 inch (0.038 cm.). The bore 18 of tubing 10 may have a diameter of 0.125 inch (0.3175 cm.), so that the radial thickness of inner portion 12 can be seen to be 0.0475 inch (0.121 cm.).

The polyvinyl chloride plastic powder, including its plasticizer, may preferably have a particle size of 50 to 150 microns, for intimate mixing of the plastic and silicone oil.

The resulting tubing exhibits good adhesion between inner and outer portions 12, 14 and, as stated above, exhibits the superior capability to withstand abrasion, providing a high lubricity on its outer surface which is not shown away in the manner of a simple silicone oil coating.

The above has been offered for illustrative purposes only, and is not intended to limit the scope of this application, which is as defined in the claims below.

That which is claimed is:

1. A coextruded plastic tubing having a permanently lubricated outer surface which comprises a pair of telescopically related inner and outer cylindrical portions, said inner portion comprising a substantially silicone-free flexible plastic formulation which has a radial thickness of 2 to 4 times that of the outer portion, said outer portion comprising a polyvinyl chloride plastic formulation containing from 2 to 3 percent by weight of a silicone oil comprising dimethylpolysiloxane having a viscosity of 500 to 100,000 cs. at 25° C., said outer portion having a radial thickness of at least 0.025 cm.

2. Coextruded tubing having a permanently lubricated surface, said coextruded tubing defining telescopically related inner and outer cylindrical portions, said inner portion comprising a flexible plastic material free of silicone oil, and said outer portion comprising a substantially homogeneous mixture of polyvinyl chloride plastic containing essentially 1 to 5 parts by weight of silicone oil homogeneously distributed therein.

3. The coextruded tubing of claim 2 in which said silicone oil is dimethylpolysiloxane having a viscosity of 500 to 100,000 cs. at 25° C.

4. The coextruded tubing of claim 3 in which said inner portion is of 2 to 4 times the radial thickness of said outer portion.

5. The coextruded tubing of claim 3 in which said outer portion has a radial thickness of at least 0.025 cm.

* * * * *